United States Patent
Takahashi et al.

(10) Patent No.: US 9,065,949 B2
(45) Date of Patent: Jun. 23, 2015

(54) DOCUMENT READING DEVICE AND IMAGE FORMATION APPARATUS

(71) Applicant: FUJI XEROX CO., LTD., Minato-ku, Tokyo (JP)

(72) Inventors: Kaoru Takahashi, Kanagawa (JP); Keisuke Uchiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/059,870

(22) Filed: Oct. 22, 2013

(65) Prior Publication Data
US 2015/0002913 A1     Jan. 1, 2015

(30) Foreign Application Priority Data

Jun. 27, 2013    (JP) ................. 2013-134430

(51) Int. Cl.
| | |
|---|---|
| *H04N 1/04* | (2006.01) |
| *H04N 1/00* | (2006.01) |
| *H04N 1/12* | (2006.01) |
| *H04N 1/193* | (2006.01) |

(52) U.S. Cl.
CPC ....... *H04N 1/00713* (2013.01); *H04N 1/00718* (2013.01); *H04N 1/00737* (2013.01); *H04N 1/00745* (2013.01); *H04N 1/00753* (2013.01); *H04N 1/1235* (2013.01); *H04N 1/125* (2013.01); *H04N 1/193* (2013.01)

(58) Field of Classification Search
CPC .............. H04N 1/00681; H04N 1/193; H04N 1/00748; H04N 1/00737; H04N 1/1017
USPC ......... 358/488, 486, 496, 498, 464, 465, 461; 399/52, 211, 212, 374, 364; 382/274, 382/245

See application file for complete search history.

(56) References Cited

U.S. PATENT DOCUMENTS

| | | | | |
|---|---|---|---|---|
| 5,790,211 | A  * | 8/1998 | Seachman et al. | 349/3 |
| 6,002,892 | A  * | 12/1999 | Takashimizu | 399/52 |
| 6,744,536 | B2 * | 6/2004 | Buchar et al. | 358/464 |
| 6,839,155 | B2 * | 1/2005 | Spencer | 358/488 |
| 6,952,293 | B2 * | 10/2005 | Feng | 358/497 |
| 7,692,818 | B2 * | 4/2010 | Futami | 358/3.26 |
| 8,659,808 | B2 * | 2/2014 | Huang et al. | 358/505 |
| 2008/0316549 | A1* | 12/2008 | Bush et al. | 358/488 |
| 2009/0109502 | A1* | 4/2009 | Minamino | 358/488 |
| 2010/0328734 | A1* | 12/2010 | Okada | 358/488 |

FOREIGN PATENT DOCUMENTS

JP    2012-039316 A    2/2012

* cited by examiner

*Primary Examiner* — Cheukfan Lee
(74) *Attorney, Agent, or Firm* — Sughrue Mion, PLLC (57) ABSTRACT

A document reading device includes: a reading position at which information on a document is read; a light source that radiates light toward the document passing through the reading position; a light receiving section that receives reflected light generated from the light from the light source; and a background reflection section disposed to reflect the light from the light source so as to be received by the light receiving section through the reading position. When the document is not present, the background reflection section reflects an amount of light that is greater than an amount of document-reflected light reflected by the document which is white. The background reflection section is formed by processing a specular surface so as to reflect an amount of light that is less than an amount of specularly reflected light reflected by a specular surface.

8 Claims, 7 Drawing Sheets

| SPECULAR FILM | REFLECTION MEMBER |
|---|---|
| | AL-PET 9-100 (COMPOSITE FILM OF ALUMINUM FOIL AND PET); MANUFATURED BY PANAC CORPORATION |
| READING GUIDE MEMBER | ATTACHMENT SURFACE OF DENTED PORTION 19a IN READING GUIDE MEMBER 19 MADE OF POLYCARBONATE RESIN |
| FILM 1 | S LUSTER PZ2 (ADHESIVE FILM); MANUFACTURED BY LINTEC CORPORATION |
| FILM 2 | HLS LUSTER 50 (ADHESIVE FILM); MANUFACTURED BY LINTEC CORPORATION |
| FILM 3 | S MATTE PZ2 (ADHESIVE FILM); MANUFACTURED BY LINTEC CORPORATION |
| FILM 4 | FNS MATTE S25 (ADHESIVE FILM); MANUFACTURED BY LINTEC CORPORATION |
| FILM 5 | HLS MATTE 50 (ADHESIVE FILM); MANUFACTURED BY LINTEC CORPORATION |
| FILM 6 | FR1615-50 (ADHESIVE FILM); MANUFACTURED BY LINTEC CORPORATION |
| FILM 7 | GLOSS PW (ADHESIVE FILM); MANUFACTURED BY LINTEC CORPORATION |
| FILM 8 | NE-tak 00081 HAIR 505N (ADHESIVE FILM); MANUFACTURED BY NICHIEI KAKOU CO., LTD. |
| FILM 9 | SP6F 100 (DIFFUSION FILM); MANUFACTURED BY KIMOTO CO., LTD. |

DOCUMENT READING DEVICE AND IMAGE FORMATION APPARATUS

CROSS-REFERENCE TO RELATED APPLICATIONS

This application is based on and claims priority under 35 USC 119 from Japanese Patent Application No. 2013-134430 filed Jun. 27, 2013.

BACKGROUND

Technical Field

The present invention relates to a document reading device and an image formation apparatus.

SUMMARY

According to an aspect of the present invention, there is provided a document reading device including:

a reading position at which information on a document is read;

a light source that radiates light toward the document passing through the reading position;

a light receiving section that receives reflected light generated from the light from the light source; and a background reflection section disposed to reflect the light from the light source so as to be received by the light receiving section through the reading position, the background reflection section reflecting an amount of light, when the document is not present, that is greater than an amount of document-reflected light reflected by the document which is white, in which the background reflection section is formed by processing a specular surface so as to reflect an amount of light that is less than an amount of specularly reflected light reflected by a specular surface.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
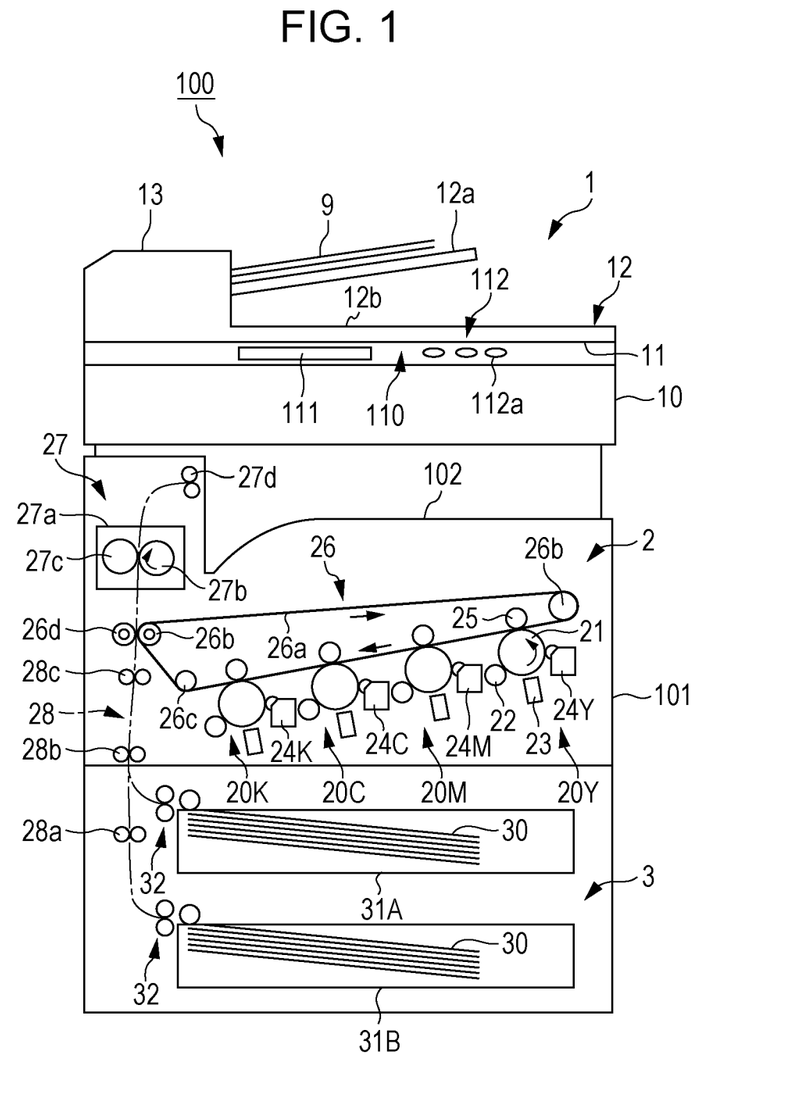
FIG. 1 is a schematic illustration illustrating a portion of an image formation apparatus including a document reading device according to a first exemplary embodiment.

FIG. 1 schematically illustrates an image formation apparatus 100 including a document reading device 1 according to a first exemplary embodiment.

<Overall Configuration of Image Forming Apparatus>

The image formation apparatus 100 according to the first exemplary embodiment includes a document reading device 1 that reads information on a document 9, an image forming section 2 that forms an image on recording paper 30 that serves as an example of a recording medium on the basis of the information on the document read by the document reading device 1 (a read image), and a paper feed section 3 that stores the recording paper 30 and feeds the recording paper 30 to the image forming section 2. In the image formation apparatus 100, the image forming section 2 and the paper feed section 3 are disposed inside a body 101, and the document reading device 1 is disposed above the body 101 with a predetermined space provided therebetween. The body 101 includes an eject/storage section 102 formed on its upper surface portion and in the space described above to eject and store the recording paper 30 on which an image has been formed.

The document reading device 1 has a housing 10. A control panel 110 that serves as an operation section and that includes a touch panel 111 and plural operation buttons 112 is disposed on an upper portion of the housing 10 on the front side. The touch panel 111 serves as a display that displays an operation menu, a warning, a message, etc. for a user, and also receives information input for the displayed operation menu such as various settings. The operation buttons 112 include at least a mixed document size button 112a that may be operated by the user when the document 9 includes documents of plural different sizes. In place of the operation button 112a, the input method for mixed document sizes may be implemented by an input screen displayed on the touch panel 111 to allow selection of mixed document sizes, for example.

The document reading device 1 includes an optically transparent document platen 11 for placement of the document 9, and a document covering 12 that is operable to open and close with respect to the housing 10 so as to cover at least the document platen 11. The document platen 11 and the document covering 12 are provided on an upper surface portion of the housing 10. The document covering 12 includes an automatic document transport section 13 that transports the document 9 to a reading position and that ejects the document 9 after being read, a document tray 12a for placement of the document 9 to be fed by the automatic document transport section 13, and a storage section 12b that stores the document 9 ejected from the automatic document transport section 13.

The image forming section 2 includes image forming units 20Y, 20M, 20C, and 20K that form a toner image in yellow (Y), magenta (M), cyan (C), and black (K) colors, respectively, an intermediate transfer unit 26 that relays and transports the toner images formed by the image forming units 20Y, 20M, 20C, and 20K until being transferred to the recording paper 30, and a fixing unit 27 that fixes the toner images transferred from the intermediate transfer unit 26 to the recording paper 30.

The four image forming units 20Y, 20M, 20C, and 20K use substantially the same electrophotographic system except that they use toners (developers) with different colors. That is, each of the image forming units 20 includes a photoreceptor drum 21 that is rotationally driven in the direction indicated by the arrow, a charging device 22 that charges the surface of the photoreceptor drum 21 to a predetermined potential, an exposure device 23 of a contact type or the like that exposes the surface of the photoreceptor drum 21 to light on the basis of image information to form an electrostatic latent image, developing devices 24Y, 24M, 24C, and 24K that develop the electrostatic latent image formed on the photoreceptor drum 21 using a toner with the corresponding color to obtain a toner image, a first transfer device 25 of a contact type or the like that transfers the toner image on the photoreceptor drum 21 to the intermediate transfer unit 26 (an intermediate transfer belt 26a) through a first transfer, and so forth. The exposure device 23 receives an image signal that has been subjected to predetermined image processing performed on the basis of information on the document 9 read by the document reading device 1 and image information input from outside the image formation apparatus 1 or the like.

The intermediate transfer unit 26 uses the intermediate transfer belt 26a which is endless and which circulates to pass through a first transfer position of each of the image forming units 20Y, 20M, 20C, and 20K. The intermediate transfer belt 26a is rotatably supported by plural rollers such as a driving roller 26b, a driven roller 26c, and a tension roller 26d that applies a tension, and rotated by the driving roller 26b in the direction indicated by the arrows. The intermediate transfer unit 26 also includes a second transfer device 26d of a contact type or the like disposed at a position opposite to the driven roller 26c across the intermediate transfer belt 26a.

The fixing unit 27 includes a housing 27a, a heating rotary member 27b in the form of a roller, a belt, or the like that is heated to a predetermined temperature by a heating unit and that is rotationally driven in the direction indicated by the arrow, a pressurizing rotary member 27c in the form of a roller, a belt, or the like that is rotated through contact with the heating rotary member 27b at a predetermined pressure, eject rollers 27d that transport the recording paper 30 after the fixation to be ejected to the eject/storage section 102, and so forth. The heating rotary member 27b and the pressurizing rotary member 27c are provided inside the housing 27a.

The paper feed section 3 is composed of a storage member 31 of a drawer type that stores plural sheets of the recording paper 30 of predetermined size, type, etc. in a stacked state, a feed device 32 such as rollers that feeds the sheets of the recording paper 30 stored in the storage member 31 to a transfer path, one sheet after another, and so forth. Plural storage members 31 (31A and 31B) may be provided, and arranged in the vertical direction of the body 101, for example. A supply/transport path 28 is disposed between the paper feed section 3 and the second transfer position of the image forming section 2 (between the intermediate transfer belt 26a and the second transfer device 26d) to transport the recording paper 30 fed from the paper feed section 3 to the second transfer position. The supply/transport path 28 is composed of plural transport roller pairs 28a to 28c, a transport guide member (not illustrated), and so forth.

<Configuration of Document Reading Device>

Figure 2:
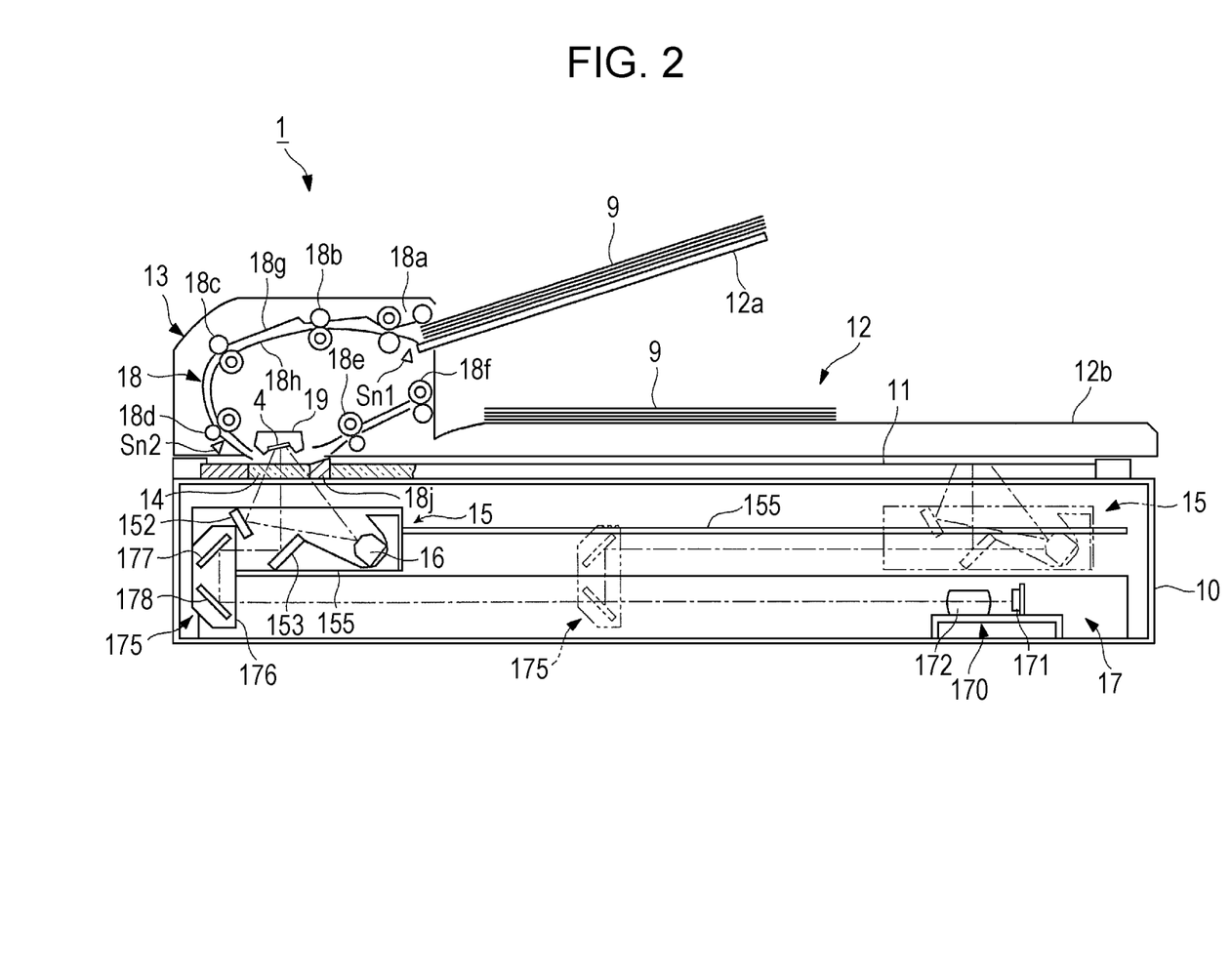
FIG. 2 is a schematic illustration illustrating the internal structure etc. of the document reading device of FIG. 1.

FIG. 2 illustrates the document reading device 1 (such as its internal structure) according to the first exemplary embodiment.

The document reading device 1 has a moving document reading mode in which information on the document 9 in the form of a sheet placed on the document tray 12a of the document covering 12 is read while the document 9 is being transported toward the storage section 12b by the automatic document transport section 13, and a stationary document reading mode in which the document 9 in the form of a sheet, a booklet, or the like placed on the document platen 11 on the upper surface of the housing 10 is read while the document 9 is stationary. The document reading device 1 allows the user to switchably select and use one of the two reading modes (functions). FIG. 2 illustrates a reading stand-by state that occurs when the moving document reading mode is selected.

The document platen 11 is disposed on the upper surface portion of the housing 10 of the document reading device 1. The document platen 11 serves as a window that allows reading of the document 9 placed on the document platen 11 in the stationary document reading mode. A reading window portion 14 is disposed on the upper surface portion of the housing 10 at a position closer to one end of the document platen 11 and opposite to the automatic document transport section 13 of the document covering 12. The reading window portion 14 serves as a window that allows reading of the document 9 transported by the automatic document transport section 13 in the moving document reading mode. Both the document platen 11 and the reading window portion 14 are composed of a colorless and transparent glass plate or the like. Further, an illumination unit 15 and a light receiving section 17 are disposed inside the housing 10. The illumination unit 15 radiates light toward the document 9 in each of the reading modes. The light receiving section 17 receives reflected light generated from the light from the illumination unit 15. In FIG. 2, the path (optical path) along which the light emitted from the illumination unit 15 travels is indicated by the double-dashed line.

The illumination unit 15 is of a movable type so that the illumination unit 15 reciprocally moves in the linear reading direction (vertical scanning direction) when the document 9 is read in the stationary document reading mode. Specifically, the illumination unit 15 is composed of a first carriage (delivery member) 150 supported to reciprocally move in the vertical scanning direction, a light source 16 that emits light, a reflector 152 that serves as a reflection member that reflects a part of the light from the light source 16 toward the document 9, and a first specular reflection plate 153 that receives reflected light from the document 9 etc. The light source 16, the reflector 152, and the first specular reflection plate 153 are mounted to the first carriage 150. The first carriage 150 is guided by a rail 155 to reciprocally move. The rail 155 is disposed inside the housing 10 to extend along the vertical scanning direction.

As the light source 16, an LED (light emitting diode) array of a line type in which plural LED chips are arranged linearly on a substrate may be used. In the light source 16 formed from the LED array, a light conducting member, a diffusion plate, etc. (not illustrated) forming a part of the LED array are adjusted in angle and position such that a part of light emitted from the plural LED chips is directly output toward a reading position Pr, and another part of the light is output toward the reflector 152. The light source 16 is disposed with its line direction (the direction along the linear arrangement of the LED chips) extending along an intersecting direction (horizontal scanning direction, or the direction that is perpendicular to the sheet surface of FIG. 2) that is substantially orthogonal to the transport direction for the document 9 in the moving document reading mode. Therefore, the first carriage 150 is a structure in an elongated form extending along the horizontal scanning direction. The reflector 152 is adjusted in angle and position such that a part of the light emitted from the light source 16 is reflected in the direction of the reading position Pr.

The illumination unit 15 is moved to a reference position (home position) below the reading window portion 14 and kept stationary in the moving document reading mode, and controlled so as to reciprocally move over an area in the vertical scanning direction below the document platen 11 in the stationary document reading mode.

The light receiving section 17 is composed of a light receiving unit 170 that reads an image formed from the reflected light from the document 9 etc. obtained from the illumination unit 15, and a reflection unit 175 that reflects the reflected light from the document 9 etc. obtained from the illumination unit 15 and guides the reflected light to the light receiving unit 170.

The light receiving unit 170 is disposed inside the housing 10 at a position closer to an end portion opposite to an end portion of the document covering 12 at which the automatic document transport section 13 is disposed. The light receiving unit 170 includes a solid-state imaging device 171 that finally receives the reflected light from the document 9 etc., an imaging lens 172 that forms an image from the reflected light from the document 9 etc. to guide the image to the solid-state imaging device 171, and so forth. As the solid-state imaging device 171, a charge-coupled device (CCD) in which one-dimensional line sensors that generate red (R), green (G), and blue (B) color signals from input light are disposed in a set of three rows may be used. The solid-state imaging device 171 divides the received reflected light which has been formed into an image by the imaging lens 172 in accordance with the colors (R, G, B), and performs a photoelectric conversion to output image signals for the R, G, and B colors as information read from the document 9 (voltage signals).

The reflection unit 175 is of a movable type so that the reflection unit 175 reciprocally moves in the vertical scanning direction together with the illumination unit 15 in the stationary document reading mode. Specifically, the reflection unit 175 is composed of a second carriage (delivery member) 176 supported to reciprocally move in the vertical scanning direction, a second specular reflection plate 177 that receives reflected light from the first specular reflection plate 153 of the illumination unit 15, and a third specular reflection plate 178 that receives reflected light from the second specular reflection plate 177. The second specular reflection plate 177 and the third specular reflection plate 178 are mounted to the second carriage 176. The second carriage 176 is guided by a rail (not illustrated) to reciprocally move. The rail is disposed inside the housing 10 to extend along the vertical scanning direction. The first specular reflection plate 153 of the illumination unit 15 and the second specular reflection plate 177 and the third specular reflection plate 178 of the reflection unit 175 are adjusted in angle, position, etc. such that document-reflected light (indicated by the double-dashed line in FIG. 2) reflected by the document 9 reaches the light receiving section 17 (and finally the solid-state imaging device 171) in the case where the document 9 is present at the reading position Pr.

The reflection unit 175 is moved to the home position described above and kept stationary together with the illumination unit 15 in the moving document reading mode, and controlled so as to reciprocally move over an area in the vertical scanning direction below the document platen 11 in the stationary document reading mode. The reflection unit 175 is formed such that in the stationary document reading mode, in particular, the amount of movement of the second carriage 176 is half the amount of movement of the first carriage 150 so that the length (line indicated by the double-dashed line) of the optical path from the reading position Pr for the document 9 to the solid-state imaging device 171 is not varied during movement of the illumination unit 15 in the vertical scanning direction. That is, the illumination unit 15 and the reflection unit 175 form a reduced imaging optical system for the light receiving unit 170 because of the relationship in amount of movement between the first carriage 150 and the second carriage 176.

The automatic document transport section 13 includes a document transport path 18 having a generally U-shaped path along which the document 9 taken from the document tray 12a is transported through the reading position Pr, at which information on the document 9 being transported is read, to be ejected to the storage section 12b.

The reading position Pr is set at a position substantially at the center, in the transport direction for the document 9, of the reading window portion 14 having a planar rectangular shape and disposed on the upper surface portion of the housing 10 at a position closer to one end of the document platen 11. The reading window portion 14 is disposed such that the longitudinal direction of the planar rectangular shape extends along the horizontal scanning direction.

The document transport path 18 is composed of a loading mechanism 18a of a roller type of the like that takes in the document 9 placed on the document tray 12a, one sheet after another, first to third transport roller pairs 18b to 18d that transport the document 9 taken in by the loading mechanism 18a to the reading position Pr, first and second eject roller pairs 18e and 18f that transport the document 9 which has been read to be ejected to the storage section 12b, transport guide members 18g and 18h that form a transport path (space) for the document 9 transported by the document transport roller pairs and eject roller pairs to guide the document 9 along the transport path, and so forth. The first to third transport roller pairs 18b to 18d and the first and second eject roller pairs 18e and 18f are rotationally driven at a corresponding rotational speed such that the document 9 is transported at a predetermined transport speed in the document transport path 18. A detection sensor Sn1 is disposed near the loading mechanism 18a to detect the presence or absence of the document 9 on the document tray 12a. A detection sensor Sn2 is disposed near the third transport roller pair 18d to detect the passage of the document 9 being transported.

Figure 3:
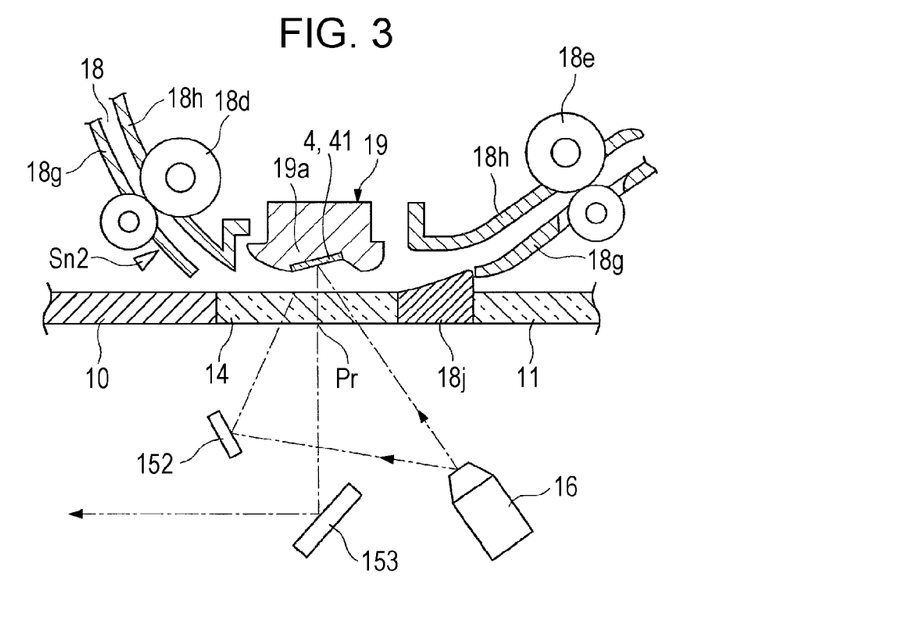
FIG. 3 is a schematic illustration illustrating a part (a portion around a reading window portion) of the document reading device of FIG. 2 as enlarged.

In the automatic document transport section 13, as illustrated in FIGS. 2 and 3, a reading guide member 19 is disposed at a position between the third transport roller pair 18d and the first eject roller pair 18e and opposite to the reading window portion 14. The reading guide member 19 guides the document 9 being transported along the document transport path 18 to the reading position Pr, and guides the document 9 which has passed through the reading position Pr in the ejection direction. The reading guide member 19 is provided with a background reflection section 4 disposed on a part of its arcuate lower surface portion facing the reading window portion 14 to serve as a background surface. An eject guide member 18j is provided between the reading window portion 14 and the document platen 11. The eject guide member 18j guides the document 9 which has passed through the reading window portion 14 toward the document transport path 18 for ejection provided with the first eject roller pair 18e.

The background reflection section (background surface) 4 reflects light emitted from the light source 16 of the illumination unit 15 so as to pass through the reading position Pr and then be received by the light receiving unit 170 (and finally the solid-state imaging device 171) of the light receiving section 17. The background reflection section (background surface) 4 is set so as to reflect an amount of the reflected light, when the document 9 is not present, that is greater than the amount of document-reflected light reflected by the document 9. The phrase "when the document 9 is not present" refers to a time when the document 9 transported by the automatic document transport section 13 is not passing through the reading window portion 14 (reading position Pr), or a time when the document 9 is not actually present (background portion) when the document 9 is passing through the reading window portion 14. The background reflection section (background surface) 4 according to the first exemplary embodiment is formed by affixing a reflection member 41 in the form of a film to a planar portion of a dented portion 19a formed in a part of the lower surface portion of the reading guide member 19. The background reflection section (background surface) 4 has a planar shape in the shape of an elongated belt extending in the horizontal scanning direction. The background reflection section 4 will be discussed in detail later.

The document reading device 1 has a function of automatically detecting end portions and the size of the document 9 and a function of detecting the amount of inclination of the document 9 during transport from information read from the background-reflected light and the document-reflected light received by the light receiving section 17 utilizing the difference (light amount difference) between the amount of the background-reflected light reflected from the background reflection section (background surface) 4 and the amount of the document-reflected light reflected from the document 9. These functions are implemented by a read image processing section (not illustrated) of the document reading device 1.

That is, for the function of detecting end portions of the document 9, the amount of the background-reflected light from the background reflection section 4 is set to be greater than the amount of the document-reflected light as discussed above. The document 9 is different from the background reflection section 4 in angle with respect to the light source 16 and the light receiving section 17. Thus, the relationship that the amount of the document-reflected light from the document 9 is less than the amount of the background-reflected light is established. As a result, the presence or absence of the document 9 at the reading position Pr may be detected on the basis of the amount of light reflected from the document 9.

Specifically, the function of detecting end portions of the document detects the leading end, the rear end, and the left and right ends of the document 9 in the transport direction as follows. First, in the vertical scanning direction during reading, when a transition is made from a state in which the document 9 is not present at (has not reached) the reading position Pr to a state in which the document 9 is present at (has reached) the reading position Pr, the reflected light received by the light receiving section 15 is changed from the background-reflected light to the document-reflected light to be reduced in light amount. Thus, the position of the leading end of the document 9 is detected. When a transition is made from a state in which the document 9 is present at the reading position Pr to a state in which the document 9 is not present at (has passed through) the reading position Pr, on the other hand, the reflected light received by the light receiving section 15 is changed from the document-reflected light to the background-reflected light to be increased in light amount. Thus, the position of the rear end of the document 9 is detected. Meanwhile, in the horizontal scanning direction during reading, in substantially the same manner as in the vertical scanning direction, the positions of the left and right ends of the document 9 are detected in accordance with a reduction in light amount due to a change in reflected light received by the light receiving section 15 from the background-reflected light to the document-reflected light or an increase in light amount due to a change in reflected light received by the light receiving section 15 from the document-reflected light to the background-reflected light. The amount of inclination of the document 9 during transport (reading) is calculated from the result of detecting the positions of the end portions of the document 9. In the first exemplary embodiment, the amount of inclination is calculated on the basis of the result of detecting the leading end and the left and right ends.

Figure 5:
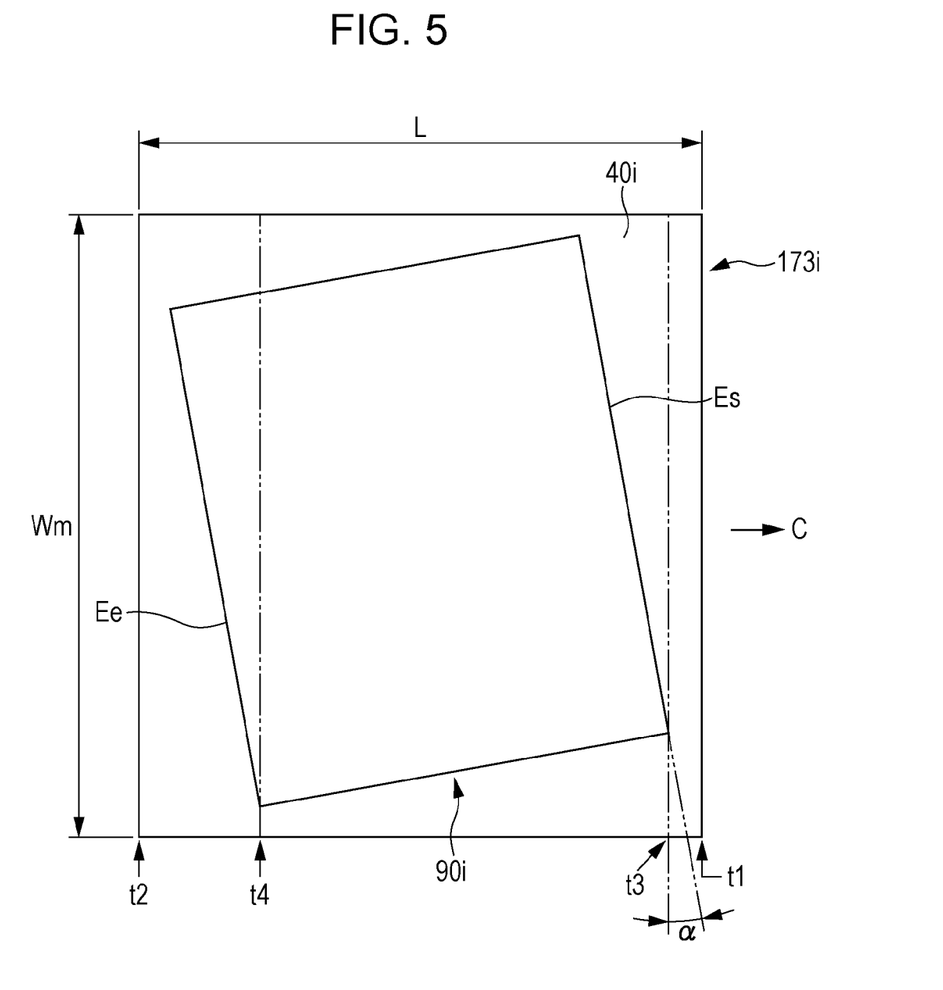
FIG. 5 is a conceptual plan view illustrating the relationship between an example of information read from a document (a read image) by the document reading device, an image processing area, etc.

The detection of the size of the document 9 is performed along with the detection of the amount of inclination of the document 9. FIG. 5 schematically illustrates an example of the relationship between an image processing area read by the solid-state imaging device 171 of the light receiving section 17 and information on the document (read image).

The maximum width Wm of an image processing area 173i in the horizontal scanning direction, which is substantially orthogonal to the transport direction C for the document 9, is prescribed by the maximum light receiving width of the solid-state imaging device 171. The length L of the image processing area 173i in the vertical scanning direction, which is substantially parallel to the transport direction C for the document 9, is defined by the reading time determined in correspondence with the state of transport of the document 9. That is, reading of the length L in the vertical scanning direction is started at a time point t1 at which the detection sensor Sn2 detects the passage of the leading end of the document 9 during transport, and ended at a time point t2 at which a predetermined time has elapsed since the detection sensor Sn2 detects the passage of the rear end of the document 9 during transport. The length L in the vertical scanning direction may be set to a value fixed in accordance with the size of the document 9. In FIG. 5, reference symbol 90i denotes a read image for the document 9. The read image 90i for the document 9 illustrated in the drawing is obtained from the document 9 transported as inclined by an angle of $\alpha$ (amount of inclination) with respect to the transport direction C. A portion of the image processing area 173i other than the read image 90i for the document 9 corresponds to a background image 40i formed by the reflected light reflected from the background reflection section 4.

When the (provisional) leading end and the left and right ends of the document 9 are discriminated in the image processing area 173i as discussed earlier, information on the leading end discriminated from a time point t3 is compiled to discriminate a predicted leading end Es (the position and the length of the leading end Es as a continuous element). A width Lw of the document 9 in the transport direction C is computed and detected (Lw=a×b) on the basis of the number of pixels a of the solid-state imaging device 171 from one end to the other end of the predicted leading end Es of the document 9 and the length b in the document width direction per one pixel. Subsequently, when the predicted leading end Es is discriminated, the inclination angle $\alpha$ of the predicted leading end Es with respect to the transport direction C is computed and detected. When the (provisional) rear end of the document 9 is discriminated in the image processing area 173i, information on the rear end discriminated from a time point t4 is compiled to discriminate a predicted rear end Ee (the position and the length of the rear end Ee as a continuous element). Consequently, the time ts required for the passage of the document 9 is acquired from the time point t1 and the time point t2 at which the provisional leading end and the provisional rear end, respectively, are detected in the read image 90i for the document 9, and the length Ln of the document 9 in the transport direction C is computed and detected (Ln=V×ts) on the basis of the time ts and the transport speed V for the document 9 in the document transport path 18.

In the case where the read image 90i for the document 9 read by the solid-state imaging device 171 is inclined (by an inclination angle $\alpha$), the inclined read image 90i (data) is rotated such that the inclination angle α becomes zero, and corrected into a read image for the document 9 with no inclination. The process of correcting an amount of inclination is implemented as an electronic inclination correction unit.

<Operation of Image Formation Apparatus>

Next, a basic operation of the image formation apparatus 100 will be described separately for a basic operation of the document reading device 1 and a basic operation of the image forming section 2.

In the document reading device 1, first, when the user places the document 9 on either the document platen 11 or the document tray 12a, and operates the touch panel 111 and the operation button 112 on the control panel 110 to give a command to read the document, an operation for reading the document 9 is started. When the command to read the document is received, the stationary document reading mode is automatically selected in the case where the detection sensor Sn1, which detects the presence or absence of the document 9 on the document tray 12a, detects the absence of the document 9, and the moving document reading mode is automatically selected in the case where the detection sensor Sn1 detects the presence of the document 9.

In the case where the stationary document reading mode is selected, the light source 16 of the illumination unit 15 starts emitting light, and the illumination unit 15 and the reflection unit 175 are driven by the first carriage 155 and the second carriage 176, respectively, to start moving in the vertical scanning direction below the document platen 11.

Consequently, the document 9 placed on the document platen 11 is illuminated by the illumination unit 15 which is moving, and the document-reflected light reflected by a surface of the document 9 facing the document platen 11 is reflected sequentially by the first specular reflection plate 153, the second specular reflection plate 177, and the third specular reflection plate 178 to thereafter be received by the light receiving section 17. In the light receiving section 17, an image is formed on the solid-state imaging device 171 through the imaging lens 172 in accordance with the document-reflected light, and output to the read image processing section or the like as information read from the document. The read image processing section samples an analog image signal (R, G, B) obtained from the solid-state imaging device 171 to hold the resulting signal, amplifies the signal, performs an A/D conversion on the signal to obtain digital image data (R, G, B), and so forth.

In the case where the moving document reading mode is selected, on the other hand, the illumination unit 15 and the reflection unit 175 are driven by the first carriage 155 and the second carriage 176, respectively, to move to be stationary at the home position below the reading window portion 14, and the light source 16 of the illumination unit 15 starts emitting light. A part of the light emitted from the light source 16 of the illumination unit 15 is directly radiated to the reading position Pr in the reading window portion 14, and another part of the light is reflected by the reflector 152 to be radiated to the reading position Pr in the reading window portion 14. Concurrently, the automatic document transport section 13 is driven to transport the document 9 placed on the document tray 12a, one sheet after another, through the document transport path 18 to pass through the reading position Pr in the reading window portion 14.

Figure 4:
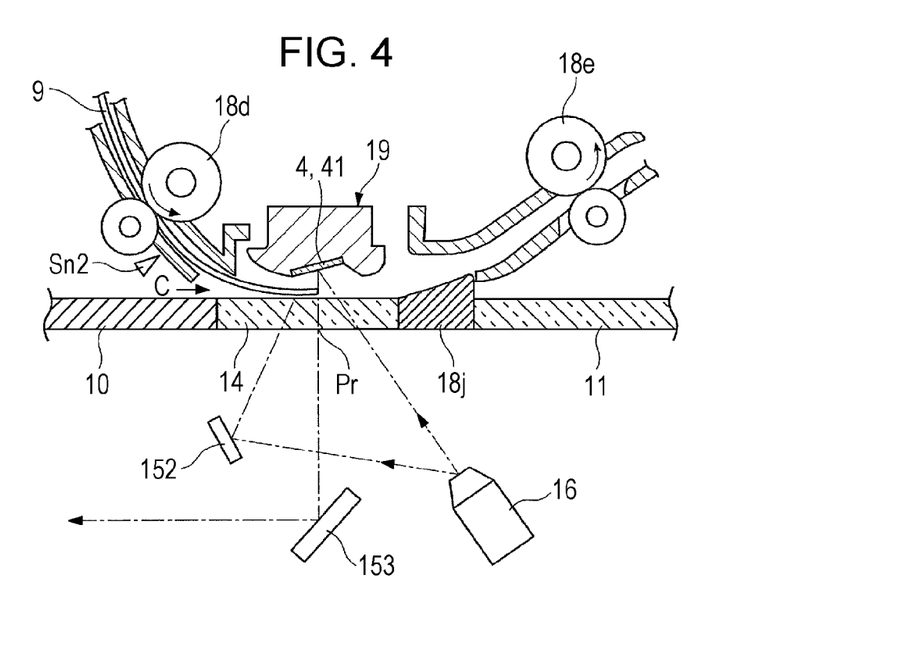
FIG. 4 is a schematic illustration illustrating a part of a document reading operation performed in a part of the document reading device of FIG. 3.

Consequently, as illustrated in FIGS. 2 and 4, the document 9 passing through the reading position Pr in the reading window portion 14 is illuminated by the illumination unit 15 which is stationary at the home position, and the document-reflected light reflected by a portion of the surface of the document 9 passing through the reading position Pr at that time is reflected sequentially by the first specular reflection plate 153, the second specular reflection plate 177, and the third specular reflection plate 178 to thereafter be continuously received by the light receiving section 17. In the light receiving section 17, an image is formed on the solid-state imaging device 171 through the imaging lens 172 in accordance with the document-reflected light, and output to the read image processing section or the like as information read from the document. After that, the sheets of the document 9 which have passed through the reading window portion 14 are sequentially ejected to the storage section 12b through the document transport path 18 to be stored.

In the document reading device 1, in the case where the mixed document size button 112a is selected when a command to read the document is given in the moving document reading mode, for example, the read image processing section (not illustrated) detects end portions, the size, and the amount of inclination of the document 9 as discussed earlier. In this event, end portions, the size, and the amount of inclination of the document 9 are detected for each sheet of the document 9 transported from the document tray 12a by the automatic document transport section 13. In the case where the document 9 is inclined, the electronic inclination correction discussed earlier is performed on the information read from the document 9.

Next, in the image forming section 2, the following image forming operation is performed on the basis of the information read from the document 9 received from the document reading device 1.

In an image processing section (not illustrated) of the image forming section 2, first, the read information received from the document reading device 1 is modulated into an image signal for each of the Y, M, C, and K colors, which is transmitted to the exposure device 23 of the corresponding image forming unit 20 (Y, M, C, K). In each of the image forming units 20 (Y, M, C, K), then, the photoreceptor drum 21 which starts rotating in the direction indicated by the arrow is charged by the charging device 22 to a predetermined potential, and thereafter an electrostatic latent image with the predetermined potential is formed on the charged surface of the photoreceptor drum 21 by light exposure based on the image signal from the exposure device 23.

Next, the electrostatic latent image formed on the photoreceptor drum 21 is developed by the corresponding developing device 24 (Y, M, C, K) into a toner image with a predetermined color. Subsequently, the toner image formed on the photoreceptor drum 21 of the image forming unit 20 (Y, M, C, K) is subjected to a first transfer performed by the first transfer device 25 onto the intermediate transfer belt 26a, which rotates in the direction indicated by the arrows, in the intermediate transfer unit 26, and thereafter transported by the intermediate transfer belt 26a to the second transfer position facing the second transfer device 26d.

In the paper feed section 3, meanwhile, along with the second transfer operation for the toner image performed by the image forming section 2, the recording paper 30 of a predetermined size, for example, stored in one of the plural storage members 31A and 31B is fed to be transported to the second transfer position in the image forming section 2 through the supply/transport path 28. Then, at the second transfer position, the toner image on the intermediate transfer belt 26a is subjected to a second transfer performed by the second transfer device 26d onto the recording paper 30.

After that, the recording paper 30 to which the toner image has been transferred through the second transfer is introduced into the fixing unit 27, and ejected to the eject/storage section 102 after the toner image is fixed to the recording paper 30.

Consequently, a predetermined image formed from the toners is formed on one surface of the recording paper 30. The image forming operation described above is repeated in the same manner in a number of times corresponding to the number of sheets of the document 9 or the number of images to be formed.

<Detailed Configuration of Document Reading Device>

In the image formation apparatus 100 including the document reading device 1, in the case where an image is formed on the recording paper 30 by the image forming section 2 on the basis of information read from the document 9 from the document reading device 1, the following image defect may be caused.

Figure 8:
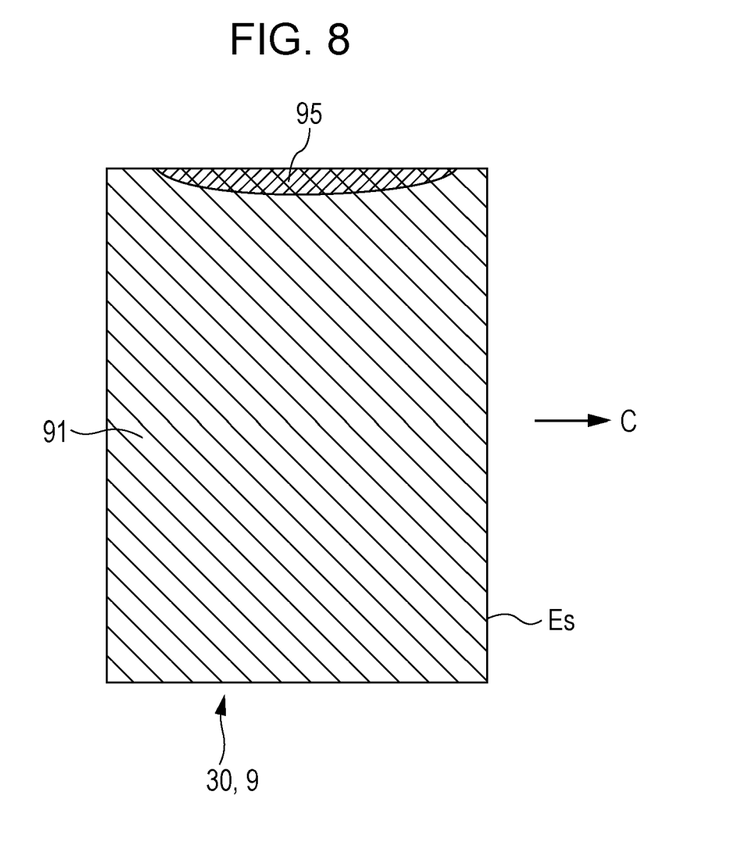
FIG. 8 is an illustration illustrating an example of the occurrence of a blur.

In an image portion 91 of the document 9 formed on the recording paper 30, as illustrated in FIG. 8, a blur 95 may occur in the image portion 91 of the document 9 (and also on the read image), which should be white, at an end portion of the document 9 in a direction substantially orthogonal to the transport direction C for the document 9 in the document reading device 1 (at an end portion of the document 9 in the width direction during transport). The blur 95 occurs at an end portion of the document 9 in the horizontal scanning direction during reading.

According to the study conducted by the inventors, the occurrence of the blur 95 is mainly caused by an unevenness in brightness (luminance) of the light source 16 in the illumination unit 15 (presence of a high-brightness portion with a relatively high brightness in a part of the light source).

The presence of an unevenness in brightness (a high-brightness portion) in the light source 16 may vary the amount of background-reflected light from the background reflection section 4 received by the solid-state imaging device 171 of the light receiving section 17, and in particular, may make the amount of light at a portion of the background-reflected light corresponding to the high-brightness portion relatively greater. Consequently, a saturated output voltage may be reached and a signal charge generated by a photoelectric conversion may overflow in a portion of pixels of the solid-state imaging device 171 corresponding to the portion of the background-reflected light with a greater amount of light, and the signal charge which has overflowed may be diffused into an adjacent portion of pixels. As a result, when switching is made in the light receiving section 17 from reception of the background-reflected light to reception of the document-reflected light, an end portion of the document 9 in a direction substantially orthogonal to the transport direction C may be recognized as having a luminance that is different from its actual luminance under the effect of the overflowing charge. That is, the presence of a high-brightness portion in a part of the light source 16 may cause the light receiving section 17 to receive such an amount of light that may affect information read from a document. If the end portion of the document 9 recognized as having a different luminance is in a white portion, a blackish blur 95 that bleeds into the white portion may be formed. If the end portion of the document 9 recognized as having a different luminance is in a colored image portion, a whitish blur 95 that bleeds into the image portion may be formed.

In the document reading device 1 according to the first exemplary embodiment, the background reflection section (background surface) 4 is formed to reflect an amount of light that is less than the amount of specularly reflected light that would be reflected by a specular surface. Therefore, the background reflection section 4 is formed to reflect an amount of light that is less than the amount of light that would be reflected by a specular surface, in addition to being basically formed to reflect an amount of light, when the document 9 is not present, that is greater than the amount of document-reflected light reflected by the document 9 as discussed earlier.

The phrase "amount of document-reflected light" indicates the amount of light that would be reflected by a white portion of the document. The configuration enables end portions of the document etc. to be detected using the difference between the amount of the background-reflected light and the amount of the document-reflected light. The term "specularly reflected light" indicates reflected light obtained when incident light is mostly regularly reflected by a specular reflection plate.

The background reflection section 4 is a reflection section (background surface) with its reflection performance reduced compared to the specular reflection plate while keeping the amount of the background-reflected light greater than the amount of the document-reflected light. Thus, the background reflection section 4 may be a reflection section with reflection characteristics in which light from the light source 16 is slightly diffusely reflected (irregularly reflected) to reduce the reflectivity. Consequently, even in the case where a high-brightness portion is present in a part of the light source 16, light from the light source 16 with an unevenness in brightness is slightly diffusely reflected by the background reflection section 4, and the light receiving section 17 receives the light in a reduced light amount. As a result, a saturated output voltage is not reached in a portion of pixels in a part of the solid-state imaging device 171 in the light receiving section 17.

More specifically, the background reflection section 4 having such reflection performance (characteristics) is formed such that a digital image signal obtained by converting an electrical signal obtained from the solid-state imaging device 171 of the light receiving section 17 through a photoelectric conversion has a value of more than 255, or more than about 255, and equal to or less than 800, or equal to or less than about 800, when represented in tone levels. If the electrical signal has a tone level of equal to or less than 255, or equal to or less than about 255, the difference between the amount of background-reflected light and the amount of document-reflected light from the white portion of the document 9 is so small that the end portions of the document 9 discussed above may not be detected. If the tone level is more than 800, or more than about 800, on the other hand, a blur may easily occur.

Figure 6:
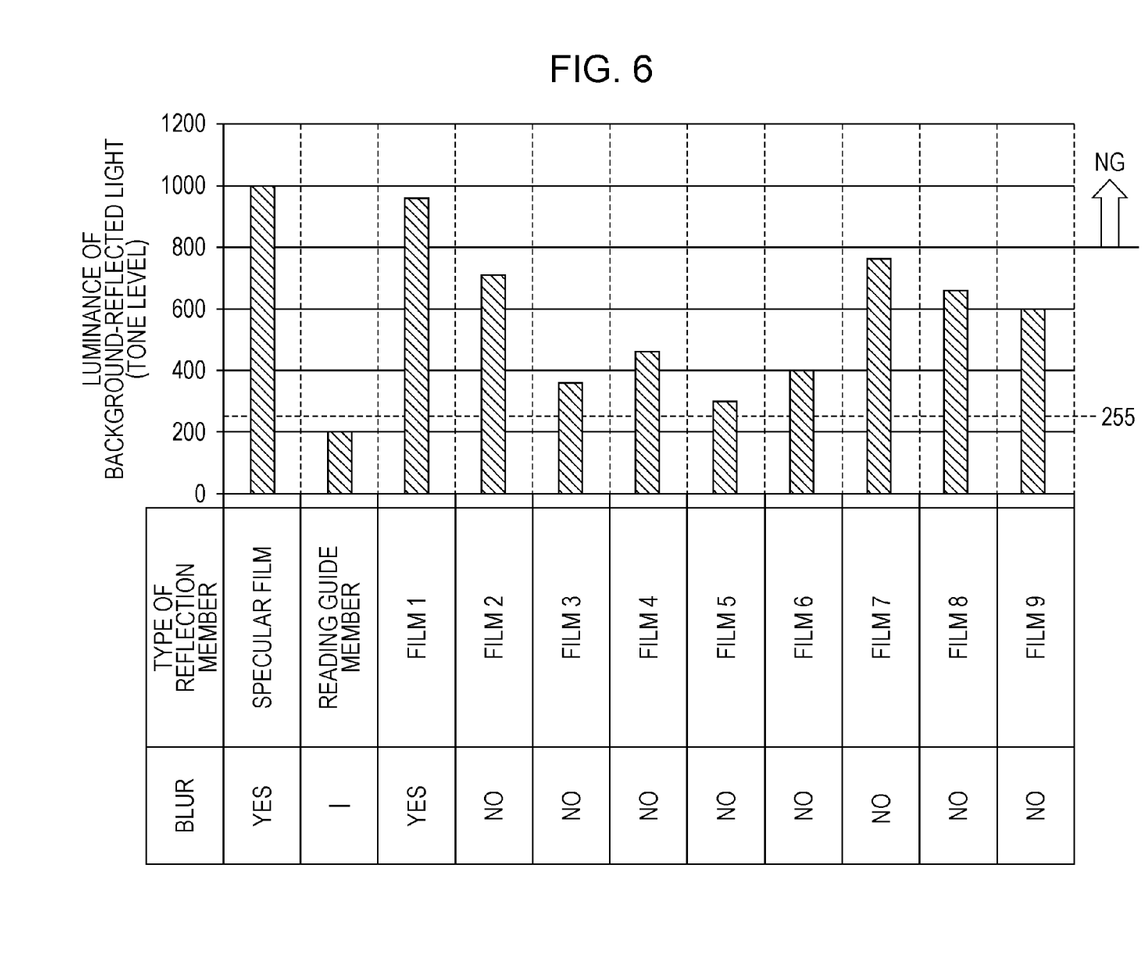
FIG. 6 illustrates the result of a test conducted to examine the luminance of background-reflected light from a reflection member forming a background reflection section and the presence or absence of occurrence of a blur.
Figure 7:
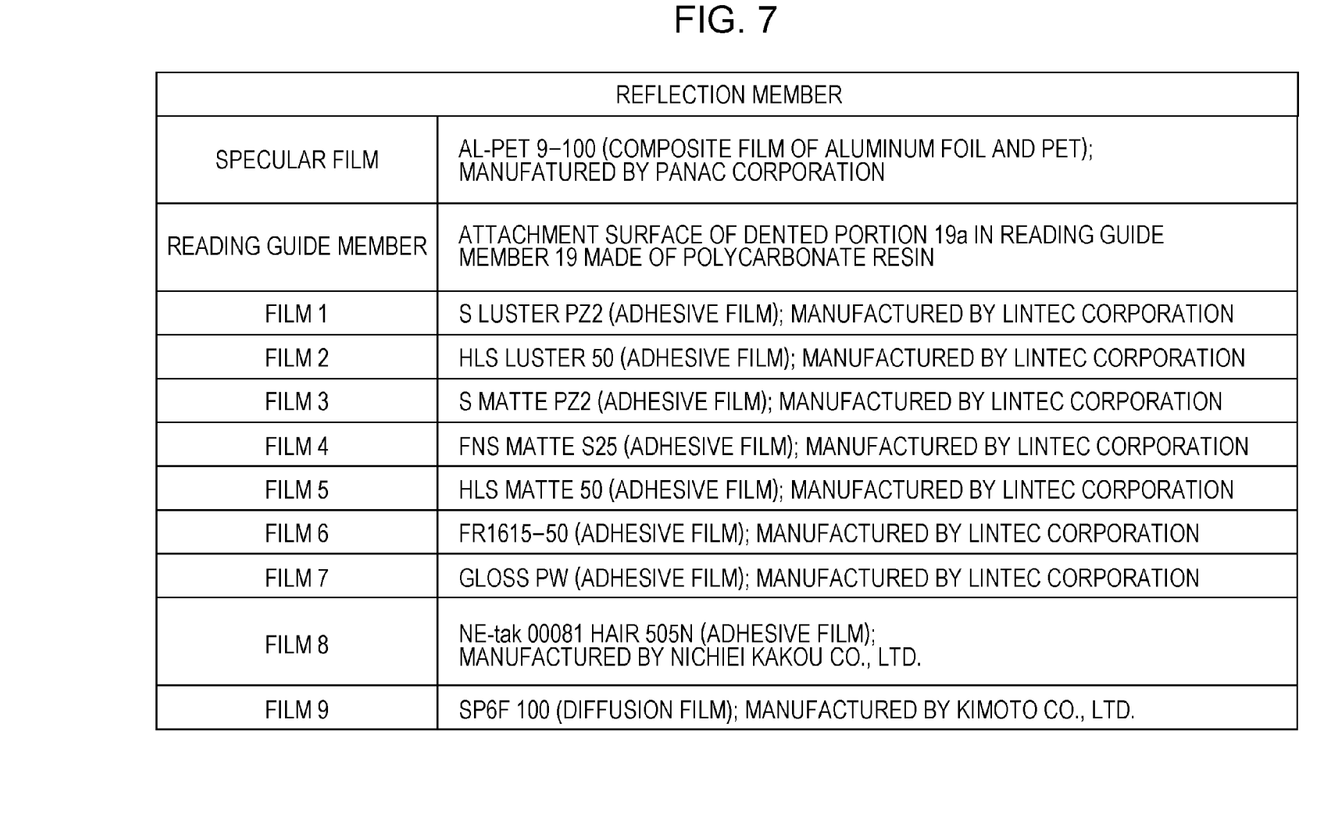
FIG. 7 is a table illustrating the details of the reflection member in FIG. 6.

FIG. 6 illustrates the result of a test conducted to examine the luminance of background-reflected light and the presence or absence of occurrence of a blur at the time when various reflection members are used to form the background reflection section 4. FIG. 7 illustrates the details of the reflection members used in the test of FIG. 6.

In order to obtain the luminance of the background-reflected light, light from the light source 16 formed from a white LED array with little unevenness in brightness is reflected by the background reflection section 4 formed from various reflection members in the document reading device 1. The resulting background-reflected light is received by the light receiving section 17 formed from a charge-coupled device (CCD) of a three-line type. Analog electrical signals for three colors (R, G, B) obtained from the charge-coupled device (CCD) are quantized by a quantization circuit (quantization section) in the read image processing section (not illustrated), and converted into 8-bit digital image information through an A/D conversion. The luminance of the digital image information is represented in 256 tone levels. In this case, the luminance of the document-reflected light from the white portion of the document 9 is set to have a tone level of about 210. Consequently, if the background-reflected light from the background reflection section (background surface) 4 has a tone level of more than 255, or more than about 255, the maximum amplitude of the wavelength of the document-reflected light reflected by the document 9 is exceeded.

In this event, the background-reflected light with a tone level of more than "255", or more than about "255", is treated as an exception, and the light is received with a neutral density (ND) filter that reduces light to one-fourth (25%), or about one-fourth, disposed before the charge-coupled device (CCD) to examine the value in 256 tone levels. That is, if the tone level value measured with the ND filter disposed is "250", for example, a value of "1000" is taken as the measured value of the luminance.

In order to obtain the presence or absence of occurrence of a blur, the document 9 is read by the document reading device 1 which uses a white LED array with a high-brightness portion provided in a part of the array as the light source 16, and an image is formed on the recording paper 30 by the image forming section 2 of the image formation apparatus 100 on the basis of the read information. As the document 9, a document with a colored (black) image portion 21 provided all over the surface is used. The document 9 and the recording paper 30 having the same size (for example, A4 size) are used.

It is found from the result illustrated in FIG. 6 that a blur occurs for reflection members with the luminance of the background-reflected light having a value of more than "800", or more than about "800". At this value, the luminance of the background-reflected light obtained from the background reflection section (background surface) 4 when the amount of light from the light source 16 is reduced to one-fourth (25%), or about one-fourth, is less than the luminance of the document-reflected light obtained when light in a normal (non-reduced) amount is radiated from the light source 16 to the document 9. The maximum tone level of the background-reflected light from the background reflection section (background surface) 4 is preferably a value that is equal to or less than three times, or about three times, the maximum amplitude of the wavelength of the document-reflected light reflected by the document 9. It is found in the test that the detection accuracy of the function of detecting an end portion of a document discussed earlier starts reducing in the case where the luminance of the background-reflected light has a value that is less than 255, or less than about 255, and that is close to that of the luminance of the document-reflected light from the white portion of the document 9, and that it is difficult to detect an end portion of a document in particular when the luminance of the background-reflected light is reduced to a value of around 210. With all things considered, it is found that occurrence of a blur may be suppressed in the case where the luminance of the background-reflected light is in the range of more than 255, or more than about 255, and equal to or less than 800, or equal to or less than about 800. More strictly, occurrence of a blur may be reliably suppressed in the case where the luminance of the background-reflected light is in the range of "equal to or more than 300 and equal to or less than 700".

In the test, the inventors attempt to reduce the amount of light to be emitted from the light source 16 itself in the document reading device 1 as a method of suppressing occurrence of a blur. In this case, however, the image quality of information read from a document (a read image) is degraded, and the method is found not to be appropriate.

Consequently, it is found to be effective to reduce the reflection characteristics (reflectivity) of the background reflection section 4, which reflects light from the light source 16 toward the light receiving section 17, as a method of suppressing occurrence of a blur even in the case where an unevenness in brightness due to a high-brightness portion is present in a part of the light source 16. That is, the background reflection section (background surface) 4 slightly diffuses (irregularly reflects) incident light, and therefore is effective in reducing the unevenness in brightness in the light source 16 described above, preventing a phenomenon that the saturated output voltage of the charge-coupled device (CCD) is reached.

In the first exemplary embodiment, the background reflection section (background surface) 4 is formed by affixing an aluminum sheet (matte film) subjected to surface roughening illustrated in FIG. 7 to the dented portion 19a of the reading guide member 19 as the reflection member 41. The luminance of the background-reflected light from the background reflection section 4 may have an average value of about 527.5 (=(800+255)/2), the value being the center value of the range of "more than 255, or more than about 255, and equal to or less than 800, or equal to or less than about 800" described above. The specular surface film (aluminum foil sheet) illustrated in FIG. 6 etc. has a reflectivity of about 90%. Therefore, it is estimated that the reflection member forming the background reflection section 4 may have a reflectivity of "about 50%", which is about half the reflectivity of the specular surface film, in order to reliably obtain a good result.

Other Embodiments

In the first exemplary embodiment, an LED array of a line type, which is a point source of light, is used as the light source 16 in the document reading device 1. However, other types of light source may also be used (such as a cold cathode fluorescent lamp (CCFL), a xenon lamp (Xe lamp), a halogen lamp, and a lamp in which an LED that emits strong light is disposed at each end portion of a light conducting member in the horizontal scanning direction to be directed inward, and light from each LED is guided through the inside of the light conducting member to be diffused in the horizontal scanning direction to be output, for example). For the light source 16 and the light receiving section 17, a light emitting/receiving unit (for example, a contact image sensor (CIS)) formed by integrating the light source 16 and the light receiving section 17 (such as a light receiving lens and a CMOS) may also be used.

In the first exemplary embodiment, in addition, the reflection member 41 in the form of a film is affixed to a part of the reading guide member 19 as the background reflection section 4 in the document reading device 1. However, a reflection surface portion (background surface) having necessary reflection characteristics may be directly formed on the lower surface of the reading guide member 19 facing the reading window portion 14, for example.

In the first exemplary embodiment, further, the document reading device 1 is combined with the image formation apparatus 100 to be used. However, the document reading device 1 may be formed to be used singly (as a scanner), or formed to function as a document reading unit of a facsimile, for example.

It is only necessary that the image formation apparatus 100 should be able to form an image on the basis of information on a document read by the image reading device 1, and the image forming method employed by the image forming section, the configuration and the presence or absence of an intermediate transfer, and so forth are not specifically limited. Examples of the image forming method include an inkjet recording method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document reading device comprising:
a reading position at which information on a document is read;
a light source configured to irradiate light toward the document passing through the reading position;
a background reflection section configured to reflect the light irradiated from the light source; and
a light receiving section configured to receive light reflected by the background reflection section,
wherein the background reflection section is configured to reflect the light irradiated from the light source so as to be received by the light receiving section through the reading position, the background reflection section reflecting an amount of light, when the document is not present, that is greater than an amount of document-reflected light reflected by the document which is white, and
wherein the background reflection section is formed by processing a specular surface so as to reflect an amount of light that is less than an amount of specularly reflected light reflected by a specular surface.

2. The document reading device according to claim 1, wherein the amount of specularly reflected light reflected by the specular surface is approximately equal to an amount of light radiated from the light source.

3. The document reading device according to claim 1, wherein the light receiving section includes a solid-state imaging device, and
wherein the background reflection section is formed such that a digital image signal obtained by converting an electrical signal obtained from the solid-state imaging device of the light receiving section through a photoelectric conversion has a value of more than about 255 and equal to or less than about 800 when represented in tone levels.

4. The document reading device according to claim 1, wherein the background reflection section is formed by disposing a surface-roughened aluminum film.

5. An image formation apparatus comprising:
the document reading device according to claim 1; and
an image forming section configured to form an image using information on a document read by the document reading device.

6. A document reading device comprising:
a light source configured to radiate light toward a document passing through a reading position;
a light receiving section configured to receive light that is radiated from the light source and then reflected by the document, as document-reflected light; and
a background surface provided opposite to the light source across the document at the reading position,
wherein the background surface is configured to reflect light with an amplitude that is more than a maximum amplitude of the document-reflected light and that is equal to or less than about three times the maximum amplitude when irradiated with light in the same amount as an amount of light radiated from the light source to the document.

7. The document reading device according to claim 6, further comprising:
a quantization section configured to quantize the light received by the light receiving section,
wherein background-reflected light reflected by the background surface has a maximum value when quantized by the quantization section.

8. A document reading device comprising:
a light receiving section configured to receive reflected light that is generated from light radiated from a light source to a document;
a processing section configured to quantize the reflected light received by the light receiving section; and
a background surface provided opposite to the light source across the document,
wherein the background surface is configured to regularly and diffusely reflect the light from the light source such that a value processed by the processing section has a maximum value when an amount of the light radiated from the light source is an amount of light radiated at a time when the document is read, and such that the value processed by the processing section is below the maximum value and is approximately equal to a value for the reflected light from the document when the amount of the light radiated from the light source is reduced to about one-fourth the amount of light radiated at the time when the document is read.

* * * * *